United States Patent Office 3,411,429
Patented Nov. 19, 1968

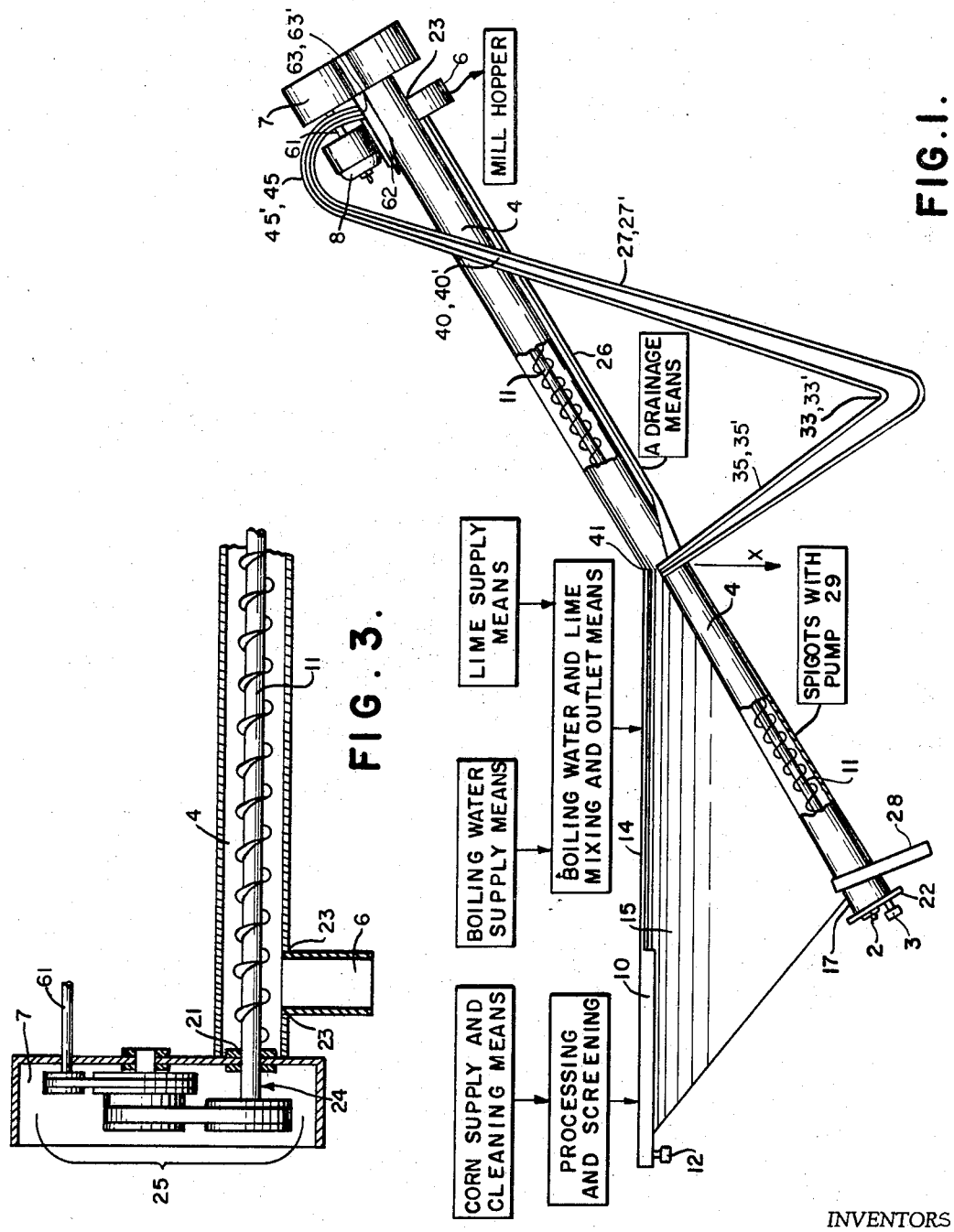

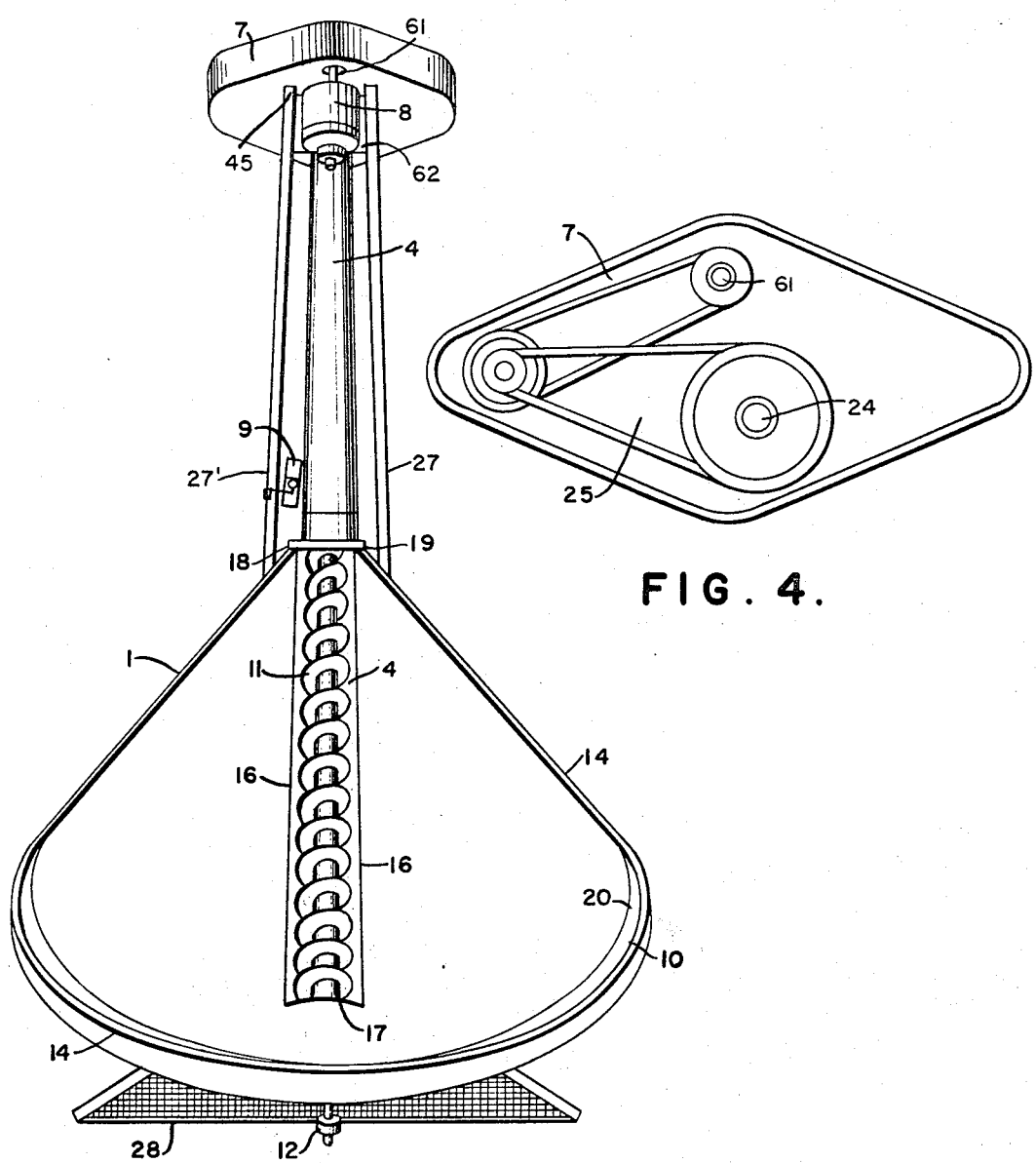

3,411,429
CONDITIONING AND LIFTING MEANS FOR NIXTAMAL TO FEED A MILL
Jose Pena Cardona and Ignacio Salinas Gonzalez, Sinaloa, Mexico, assignors to Ismael G. Saldana
Filed Dec. 9, 1966, Ser. No. 600,667
1 Claim. (Cl. 99—237)

ABSTRACT OF THE DISCLOSURE

A conditioning vat has a tubular housing opening into it on a lower, upwardly slanting wall. The tubular housing extends upwardly from its connection with the vat. Within the housing is a screw conveyer, which is driven by a motor mounted at the upper end of the tubular housing. Means are provided to introduce water into the lower part of the housing and thus into the vat. Drains are provided in the underside of the housing above the vat, in the bottom of the vat and in the upper periphery of the vat. The drain in the upper periphery of the vat is a trough in the wall. Overflow containing refuse floating material is ejected by this trough. Treated material rises in the tubular housing and is finally ejected to a hopper.

Background of the invention

The present invention relates to an apparatus for conditioning, washing and lifting nixtamal to feed a mill. The word "nixtamal" as used in this invention designates corn scalded in lime water for producing the Mexican "tortilla" and similar products.

Summary of the invention

The primary object of the invention is to provide a novel apparatus for performing the step of conditioning and washing nixtamal and for subsequently feeding it to mill hoppers by eliminating manual labor, hand-washing and hand feeding of the mill hoppers.

Another object of the invention is to provide a structure, whose various non-symmetrical and widely diverse parts, nevertheless, present a structure supported on three spaced legs balanced relative to its center of gravity and providing a stability offsetting any vibrations in its operation and simultaneously providing an apparatus which can be inexpensively produced and operated.

Other objects and many advantages of the invention will become apparent to those skilled in the art, after a study of the following detailed description in connection with the accompanying drawings, wherein:

Brief description of the drawing

FIG. 1 is a side view of the apparatus embodying the invention, with areas cut away to illustrate internal aspects of the apparatus.

FIG. 2 shows a prospective view of the apparatus from above.

FIG. 3 is a sectional side view of the mill hopper-feeding and drive end of the apparatus.

FIG. 4 shows an end view of the drive transmission of the apparatus.

Proportions shown in the figures are to scale.

Description of the preferred embodiments

Referring in detail to the drawings, FIGS. 1–4 show that the embodiment of the present invention comprises a conditioning and washing assembly (1, 14, 15, 18, 19, 16, 17, 20, 10, 12), a feeding assembly (4, 11, 21, 3, 22, 6, 23, 9, 29), a drive assembly (24, 25, 8, 7) and an external support assembly (26, 27, 27', 28, 33, 33', 35, 35', 45, 45', 63 and 63').

In FIG. 1, suspended above the main structure, are shown diagrammatically means providing with the aid of gravity a corn supply, its cleaning, processing and screening. Waste materials are withdrawn by conventional means, not shown, and an outlet is provided for delivery below.

Also suspended above the main structure are supply means of boiling water and lime and a mixing vat for them with an outlet for delivery below.

The various parts are shaped to contribute to a weight balanced effect for stability purposes.

As seen in FIGS. 1 and 2, the conditioning and washing assembly comprises a scalder-washer vat 1 having an upper lip 14 lying in a horizontal plane. The lip extends from upper lip end 18 to upper lip end 19. The containing surface 15 of this vat extends downwards from the lip 14 and has a slot 16 extending from lowest point 17 upwards to lip ends 18 and 19. The vat has a triangular vertical cross-section.

The walls of the vat are tilted inside downwardly and have a shape in the horizontal plane resembling that of a cross-section of a pear with a wide one end. The opposite end narrows toward the feeding screw. This particular shape of the vat is symmetrical, aids the reception of materials from the superimposed outlets of the auxiliary means on its wider portions, its narrowing opposite end can be simply attached and/or extended into the feeding tube of the screw and the feeding of the material therethrough is facilitated.

Located lower than the upper lip 14 is overflow lip 20. Trough 10 lies between the upper lip and the overflow lip. Tube 12 is situated at the lowest point in the trough.

FIGS. 1, 2, and 3 show the feeding assembly. Slot 16 is welded to a matching slot located in the upper part of the tubular screw-housing 4. Screw conveyor 11 is located centrally within the housing. It protrudes radially outwards into the vat and is mounted on lower journal bearing 2 and upper journal bearing 21. Screened outlet tube 3 extends from the lowest point of the housing outwards through end-sealing plate 22. Discharge tube 6 is welded to the conforming edges of discharge hole 23 situated on the under side of the upper part of the housing. Control panel 9 is mounted above the vat on the screw housing and contains an on-off switch for the motor in the drive assembly and a rinse water valve. The rinse water enters into the vat through a plurality of spigots 29 located along the bottom of the screw housing beneath the vat.

FIGS. 3 and 4 show the drive assembly. Shaft 24 of the screw conveyor is connected at its end and beyond the upper journal bearing to a conventional belt-pulley drive transmission 25. Motor 8, seated on the housing 4 via platform 62, is connected at the input end of this transmission via shaft 61. Safety housing 7 surrounds the transmission and is welded to the upper end of screw-housing 4, thereby also forming the upper end-cover of the screw housing.

FIGS. 1 and 2 show the external support assembly. Re-inforcement 26 steadies the screw housing, while two S-frames (35, 33, 27, 40, 45, and 63) and (35', 33', 27', 40', 45', and 63') support the upper part of the apparatus and provide a firm mount for the motor. The apparatus is supported on its lower end by a leg section 28.

The external support means are correlated to the unified structure of the assembly to support it in toto with maximum load carrying ability, the combination of the various means being assembled in symmetric structural, dimensional and weight proportions the weight distribution being symmetrically arranged about a common axis "x." The lower sector of the feeder means forms one weight bearing support and the legs 34 and 35 a second bearing support. Legs 35 and 35' meet the housing 4 at their intersection with the axis "x." The lower sector of the feeder means and the legs 35 and 35' form a section which simultaneously supports both the conditioning and the lower feeding sector of the apparatus and at support point 41 the upper sector thereof together with drive and delivery means, the relative forces in these two sectors, one on each side of the axis "x" pressing against each other by their weight and thus simultaneously improving the stability of the structure. Leg 35' is hidden in FIG. 1 by leg 35 and joins screw housing 4 on its back side at the "x" axis.

The vertical axis "x" represents an approximate center of gravity of the total structure.

Thus the approximate weight and dimensions of the portion of the total structure on one side of the vertical axis thereof are approximately equal in weight effect and distribution to those of the other side of the "x" axis so that the weight distribution mutually contributes to the stability of the structure seated on three spaced legs 28, 35 and 35'. The legs 27, 27', 35 and 35' are supported by ground below their junctures at 33, 33', parts 27', 33' and 35' being hidden in FIG. 1 by 27, 33, and 35, respectively.

Operation of the apparatus starts with screened corn being placed in the vat. With outlet tube 3 closed and the drive assembly inoperative, lime and boiling water are poured over the corn. After a conditioning period, the liquor in the vat is emptied through the outlet tube 3. This is then closed again and the rinse water valve is turned on at 9 to rinse the nixtamal. Lime, dust, hulls and other waste is thereby washed over lip 20 into trough 10 and out tube 12.

When the water surrounding the conditioned nixtamal is clear, the motor is started by the switch at 9 and the screw conveyor 11 lifts the nixtamal through the screw housing 4. During lifting, water drains from the nixtamal through the clearance between the screw and its housing and back into the vat, diagrammatically shown under the upper section.

Drainage means of the feeder system include preferably a liquid exhaust source and a heater-drier means.

Nixtamal reaching the discharge tube 6 drops through it into a mill hopper waiting below.

For claim purposes, the feeder means, while an undivided unit, is described as comprising three sectors, the lower sector extending from plate 22 to support point 41, the central sector extending from 41 to support pass-by 40 and the upper sector extending from 40 to bearing 21.

The assembly structurally comprises in cross-section of FIG. 1 a series of interdependent structures, which mutually support each other; the vat sector 12–2–41; the floor stand sector 2–41–33, 33', including extended leg 28; and the central and upper, motor supporting sector 41–(33, 33')–(40, 40')–(45, 45')–(63, 63'), points 40 and 40' lying between central and upper.

It should be understood, of course, that the foregoing disclosure relates to only preferred embodiments of the invention and that it is intended to cover all changes and modifications of the examples of the invention therein chosen for the purposes of the disclosure, which do not constitute departures from the spirit and scope of the invention set forth in the appended claim.

The invention claimed is:

1. An apparatus for conditioning, washing, bleaching and separating selected portions of nixtamal and feeding it to a mill hopper, comprising as one unit a weight balanced structurally stable integral assembly having a series of interconnected sectors, including a vat sector, a floor-stand sector, and a central and upper support sector, said assembly further including an auxiliary assembly suspended above the vat sector, said several sectors structurally arranged about a common vertical axis through the approximate center of gravity of the assembly, the bottom corners of said vat sector and of said central sector forming at least part of said floorstand sector with major leg support points, at least one spaced on each side of the vertical axis, whereby the respective weight distribution on both sides of the vertical axis of the structure balances both sides of the assembly for stability, said vat sector comprising a conditioning scalder-washer vat having a triangular vertical cross-section and a pear shape in its upper horizontal plane; said vat having an elongated slot from the bottom-center of the wide end to the narrow end; a feeding means comprising a tubular housing having a lower, a central and an upper sector, the lower sector thereof connected integrally with the slot in the narrow end of the vat and along its lower bottom with the interior of the tubular housing open to the interior of said vat; a screw conveyor mounted rotatably within the tubular housing; rinsing spigots mounted on the bottom portion of the lower sector of said tubular housing below the vat, a pump connected to said spigots; a water valve to control the output of the pump to the spigots; drainage means under the lower section of the central sector of the tubular housing; a trough in the upper rim of the vat leading downwardly along the wall of the vat to an outlet; a marginal lip around at least a portion of the periphery of the vat for directing the overflow of rinse water from the vat into the trough; screw conveyor outlet means at the upper end of said housing and screw conveyor drive means at the upper end of said tubular housing.

References Cited

UNITED STATES PATENTS

| 3,083,634 | 4/1963 | Rietz | 99—239 |
| 3,194,664 | 7/1965 | Eytinge | 99—237 X |

FOREIGN PATENTS

| 107,081 | 2/1899 | Germany. |
| 158,331 | 3/1940 | Germany. |
| 201,569 | 1/1924 | Great Britain. |
| 485,174 | 10/1953 | Italy. |

WALTER A. SCHEEL, *Primary Examiner.*

J. M. NEARY, *Assistant Examiner.*